United States Patent [19]
Aleshin

[11] Patent Number: 5,486,676
[45] Date of Patent: Jan. 23, 1996

[54] COAXIAL SINGLE POINT POWDER FEED NOZZLE

[75] Inventor: Stephen Aleshin, Cincinnati, Ohio

[73] Assignee: General Electric Company, Cincinnati, Ohio

[21] Appl. No.: 339,388

[22] Filed: Nov. 14, 1994

[51] Int. Cl.[6] .................................................. B23K 26/14
[52] U.S. Cl. .......................... 219/121.63; 219/121.84; 239/79; 239/290; 222/566
[58] Field of Search ...................... 219/121.47, 121.6, 219/121.63, 121.64, 121.84, 121.65, 121.66; 118/308, 620; 228/33; 239/79, 81, 290, 296, 85; 222/566; 427/597

[56] References Cited

U.S. PATENT DOCUMENTS

| | | | |
|---|---|---|---|
| 2,389,702 | 11/1945 | Ullmer | 239/79 |
| 2,671,689 | 3/1954 | Wett | 239/85 |
| 4,562,961 | 1/1986 | Guenard et al. | 239/79 |
| 4,634,832 | 1/1987 | Martyr . | |
| 4,724,299 | 2/1988 | Hammeke . | |
| 4,804,815 | 2/1989 | Everett | 219/121.6 |
| 4,814,575 | 3/1989 | Petitbon | 219/121.64 |
| 4,835,357 | 5/1989 | Schalk | 219/121.64 |
| 4,866,242 | 9/1989 | Martyr | 219/121.64 |
| 5,122,632 | 6/1992 | Kinkelin | 219/121.63 |
| 5,182,430 | 6/1993 | Lagain | 219/121.63 |
| 5,208,431 | 5/1993 | Uchiyama et al. | 291/121.65 |
| 5,245,155 | 9/1993 | Pratt et al. | 219/121.63 |

FOREIGN PATENT DOCUMENTS

| | | | |
|---|---|---|---|
| 0573928 | 12/1993 | European Pat. Off. | 219/121.64 |
| 1-249613 | 10/1989 | Japan . | |
| 2-155585 | 6/1990 | Japan . | |
| 4-210886 | 7/1992 | Japan | 219/121.6 |

*Primary Examiner*—Teresa J. Walberg
*Assistant Examiner*—Gregory L. Mills
*Attorney, Agent, or Firm*—Andrew C. Hess; David L. Narciso

[57] ABSTRACT

A coaxial single point powder feed nozzle includes an inner tube disposed coaxially within an outer tube. The inner tube has a powder inlet and powder outlet, and the outer tube has a gas inlet for receiving a shaping gas, and a single nozzle outlet. An intermediate portion of the outer tube is spaced radially outwardly from the inner tube to define an annular flow manifold therebetween which receives the shaping gas. The powder outlet is disposed coaxially with the nozzle outlet and is spaced therefrom to define an annular gas outlet for the manifold for channeling the shaping gas around the powder prior to discharge thereof from the nozzle outlet.

10 Claims, 2 Drawing Sheets

COAXIAL SINGLE POINT POWDER FEED NOZZLE

The present invention relates generally to laser beam welding, and, more specifically, to a feed nozzle for supplying powder metal for laser welding.

BACKGROUND OF THE INVENTION

Many laser welding applications require the addition of powdered metal into the weld being formed. This is typically accomplished by using a conventional powder feed nozzle which simply directs a stream of powder metal into the weld pool. A loose powder is channeled through the feed nozzle either with or without an inert carrier gas and is discharged therefrom in the form of a stream. As the powder stream is discharged, it undesirably diverges in configuration. Accordingly, the nozzle outlet must be placed very close to the weld pool during operation which limits access of the welding beam and may result in accumulation of powder around the nozzle outlet which may lead to clogging thereof. This may also lead to spattering of the powder on the workpiece which is also undesirable.

SUMMARY OF THE INVENTION

A coaxial single point powder feed nozzle includes an inner tube disposed coaxially within an outer tube. The inner tube has a powder inlet and powder outlet, and the outer tube has a gas inlet for receiving a shaping gas, and a single nozzle outlet. An intermediate portion of the outer tube is spaced radially outwardly from the inner tube to define an annular flow manifold therebetween which receives the shaping gas. The powder outlet is disposed coaxially with the nozzle outlet and is spaced therefrom to define an annular gas outlet for the manifold for channeling the shaping gas around the powder prior to discharge thereof from the nozzle outlet.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
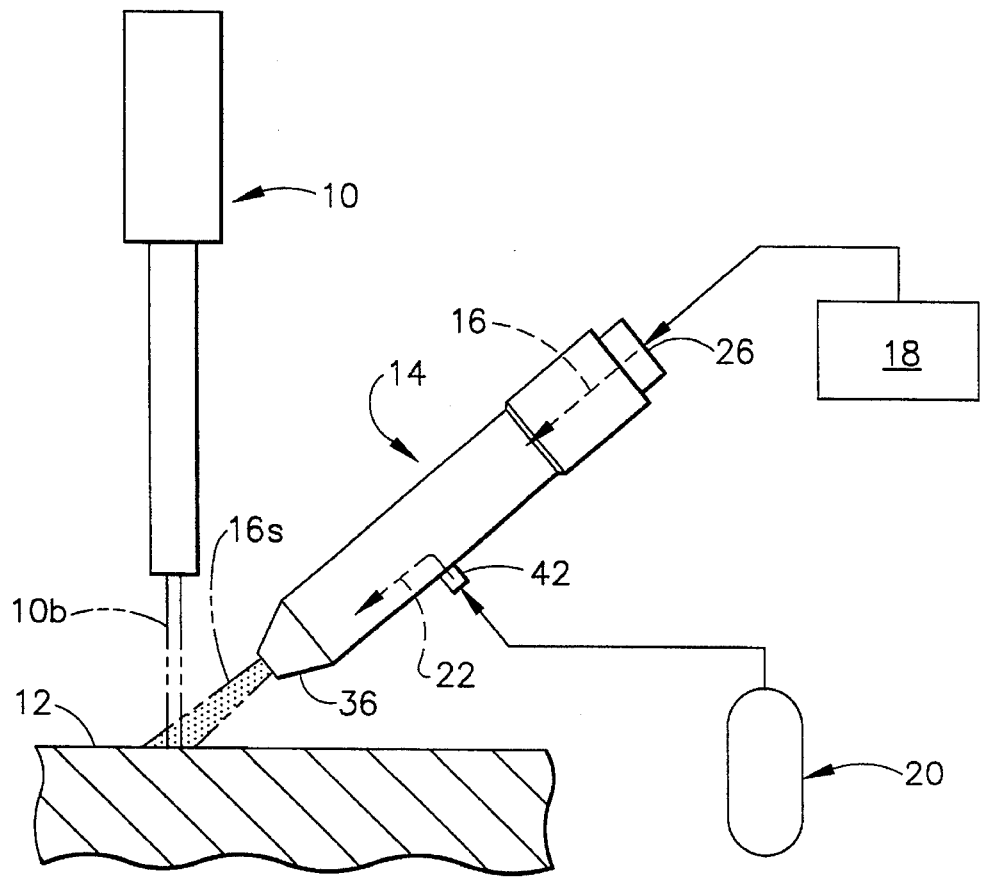
FIG. 1 is a schematic representation of a powder feed nozzle in accordance with one embodiment of the present invention for use in laser welding of a workpiece.

Illustrated schematically in FIG. 1 is a conventional welding laser 10 effective for producing and directing a welding laser beam 10b at a suitable metal workpiece 12 which requires welding. A powder feed nozzle 14 in accordance with one embodiment of the present invention is provided for ejecting a conventional welding powder metal or filler 16 in a stream designated 16s toward the workpiece 12 and adjacent to the laser beam 10b for laser welding.

Conventional means 18 are provided for supplying the powder metal 16 to the nozzle 14 with a suitable inert carrier gas such as Argon for example. Conventional means 20 are also provided for supplying a suitable inert shaping gas 22, such as Argon or Helium for example, to the nozzle 14 for reducing the divergence of the powder stream 16s discharged from the nozzle 14 in accordance with the present invention.

Figure 2:
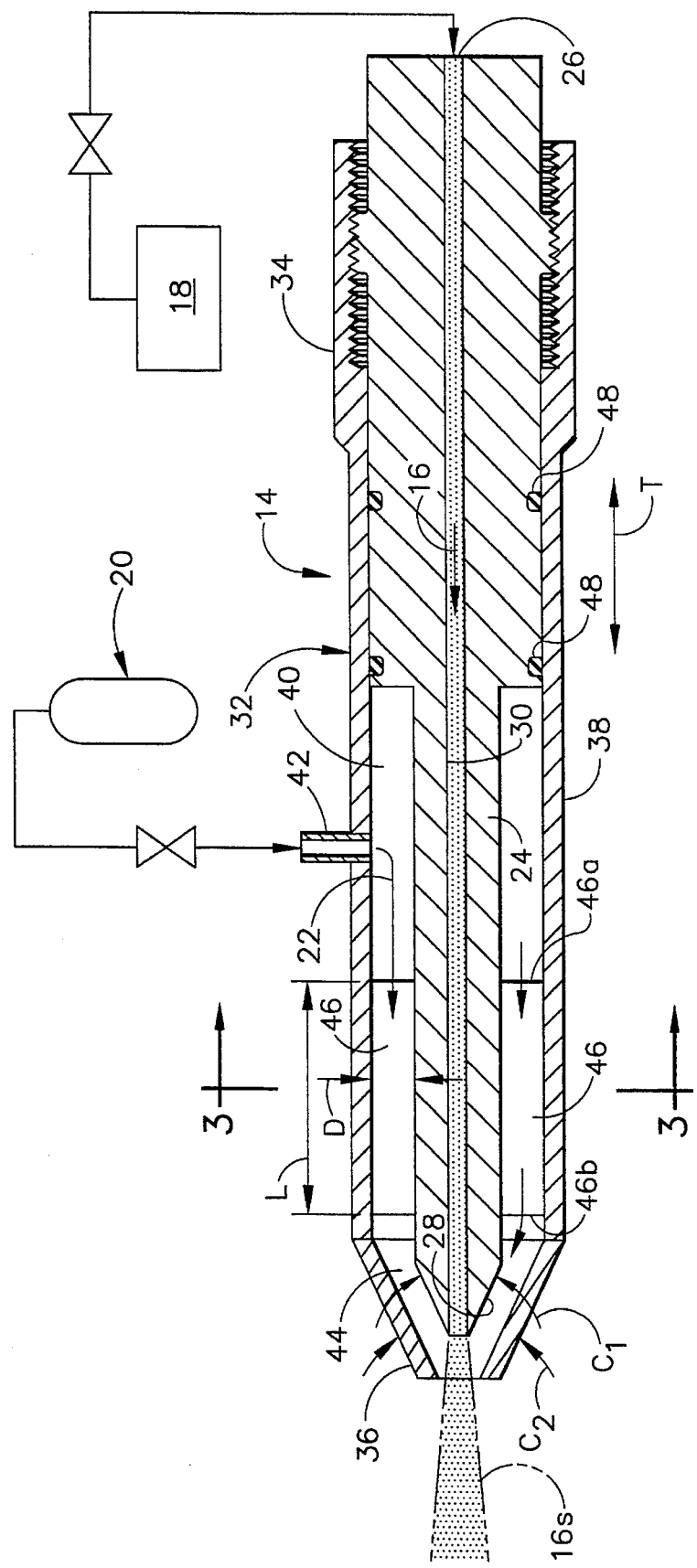
FIG. 2 is an axial sectional view of the powder feed nozzle illustrated in FIG. 1 in accordance with one embodiment of the present invention.

As shown schematically in FIG. 2, the shaping gas supply 20 is in the exemplary form of a suitable tank which contains the shaping gas 22 and is disposed in flow communication through a suitable control valve and supply conduits to the nozzle 14. The powder supply 18 includes a suitable powder reservoir joined in flow communication with the nozzle 14 through a suitable powder feed wheel and supply conduit for example.

The improved nozzle 14 in accordance with one embodiment of the present invention includes an inner tube 24 having a powder inlet 26 at a proximal end thereof disposed in flow communication with the powder supply 18 for receiving therefrom the powder metal 16 with the carrier gas. The inner tube 24 further includes a powder outlet 28 at a distal end thereof for discharging the powder metal 16 which is carried through a central supply channel 30 between the powder inlet 26 and outlet 28.

The nozzle 14 also includes a thin wall, generally cylindrical outer tube 32 disposed radially outwardly of the inner tube 24 and coaxially therewith about an axial centerline axis of the nozzle 14. The outer tube 32 has a mounting end 34 at a proximal end thereof which is adjustably fixedly joined to the inner tube 24 adjacent to the powder inlet 26 as described in more detail below.

The outer tube 32 also includes a single point nozzle outlet 36 at an opposite distal end thereof, and an integral intermediate portion 38 extending axially between the mounting end 34 and the nozzle outlet 36. The intermediate portion 38 is spaced radially outwardly from an intermediate portion of the inner tube 24 to define an annular flow manifold 40 therebetween. Disposed in the intermediate portion 38 is a gas inlet 42 suitably disposed in flow communication with the gas supply 20 for receiving therefrom the shaping gas 22, and channeling the gas 22 into the manifold 40.

The powder outlet 28 is disposed coaxially with the nozzle outlet 36 and is spaced axially aft therein to define therebetween an annular gas outlet 44 for the manifold 40 for channeling the shaping gas 22 around the powder metal 16 discharged from the powder outlet 28 prior to discharge thereof through the single nozzle outlet 36. In this way, the shaping gas 22 forms a shaping annulus of inert gas around the powder 16 being discharged from the powder outlet 28, which occurs inside the nozzle outlet 36, with the shaping gas 22 and powder metal 16 then being discharged through the single nozzle outlet 36 for forming the powder metal stream 16s. The flowrate of the shaping gas 22 relative to the flowrate of the powder metal 16 may be suitably adjusted for decreasing the divergence of the powder metal stream 16s being discharged from the nozzle outlet 36. This allows for better control of the powder stream 16s which can improve welding process quality and repeatability. The tighter powder stream 16s can also help increase powder capture efficiency in the welding process which saves powder and reduces waste. Since the tighter powder stream 16s can travel further without significant stream spread, the nozzle 14 can be located further away from the workpiece 12, thusly reducing the possibility of clogging.

Figure 3:
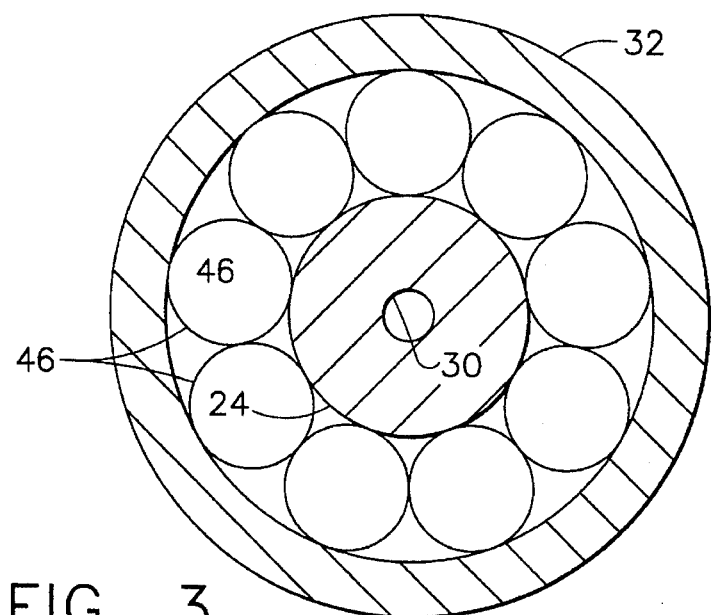
FIG. 3 is a radial sectional view through the powder feed nozzle illustrated in FIG. 2 and taken along line 3—3.

As shown in FIGS. 2 and 3, the nozzle 14 preferably also includes a plurality of circumferentially spaced apart, axially elongate shaping tubes 46 disposed radially between the inner and outer tubes 24, 32 at a downstream or forward end of the manifold 40 axially between the gas inlet 42 and the gas outlet 44. Each shaping tube 46 has an inlet 46a at an aft end thereof disposed in flow communication with the manifold 40, and an outlet 46b at an opposite forward end thereof disposed in flow communication with the gas outlet 44. The several shaping tube outlets 46b collectively channel the shaping gas 22 from the manifold 40 to the common gas outlet 44.

In the exemplary embodiment illustrated in FIGS. 2 and 3, the shaping tubes 46 are cylindrical and circumferentially adjoin each other around the circumference of the inner tube 24, with nine exemplary tubes 46 being illustrated in abutting contact. The tubes 46 are straight and parallel to each other and extend axially relative to the axial centerline axis of the nozzle 14. Each tube 46 has a length L, an outer diameter D, and is a relatively thin wall tube, and in one embodiment has respective dimensions of 19 mm, 1.5 mm, and 0.25 mm, with an outer diameter of the nozzle 14 or outer tube 32 being about 10 mm.

Accordingly, the axially aligned shaping tubes 46 ensure that the shaping gas 22 is confined to flow solely in an axial direction and collectively form an annulus of the shaping gas 22 within the gas outlet 44 to effectively confine the powder metal 16 being discharged from the powder outlet 28. As shown in FIG. 3, the shaping gas 22 is allowed to flow within each of the shaping tubes 46 as well as within each of the generally triangular interstitial spaces formed between the tubes 46 and the inner and outer tubes 24, 32 with the flow in all of these passages being axial only.

Referring again to FIG. 2, the inner tube supply channel 30 is preferably cylindrical from the powder inlet 26 to the powder outlet 28 and has a constant flow area at all sections therebetween for ensuring substantially uniform travel of the powder metal 16 therethrough without accumulation therein.

Also in the preferred embodiment of the nozzle illustrated in FIG. 2, the powder outlet 28 preferably has a frustoconical outer surface, with the supply channel 30 being disposed coaxially therewith. Correspondingly, the nozzle outlet 36 has parallel frustoconical outer and inner surfaces, with the conical inner surface being spaced from the conical outer surface of the powder outlet 28 to define the gas outlet 44 therebetween. In this way, the shaping gas 22 is confined to flow at a relatively small acute angle of incidence with the powder metal 16 being discharged from the powder outlet 28 which assists in reducing divergence of the powder metal stream 16s. Since the gas outlet 44 is defined between conical surfaces, it decreases in flow area for accelerating the shaping gas 22 around the powder metal 16.

The conical outer surface of the nozzle outlet 36 also provides additional clearance between the nozzle 14 and the laser beam 10b (see FIG. 1) which improves the welding process since the laser 10 and the nozzle 14 are typically aligned obliquely with each other which ordinarily limits available access room in the vicinity of the welding pool.

As shown in FIG. 2, the conical outer surface of the powder outlet 28 has a first cone angle $C_1$, and the conical inner surface of the nozzle outlet 36 has a second cone angle $C_2$. These cone angles $C_1$ and $C_2$ may be suitably adjusted for varying the effectiveness of shaping the powder metal stream 16s, and in the preferred embodiment, the first cone angle $C_1$ is less than the second cone angle $C_2$, with the former being about 20° and the latter being about 30° for example. In this way, the gas outlet 44 converges also in axial section and allows for relatively close adjustment between the powder outlet 28 and the nozzle outlet 36.

More specifically, in the exemplary embodiment illustrated in FIG. 2, the outer tube mounting end 34 includes suitable internal threads which mate with complementary external threads on the inner tube 24. This allows the outer tube 32 to be threadingly joined to the inner tube 24 for allowing selective axial translation T therebetween for adjusting size of the gas outlet 44 defined between the powder outlet 28 and the nozzle outlet 36 therearound. Since the outer tube 32 is allowed to axially translate, the shaping tubes 46 are preferably fixedly joined solely to the inner tube 24, and may be conventionally brazed thereto. Since the manifold 40 carries the supply gas 22, suitable O-ring type seals 48 are provided between the aft end of the inner tube 24 and the outer tube mounting end 34 for suitably sealing the sliding joint therebetween.

The coaxial single point powder feed nozzle 14 disclosed above allows more precise feeding of the powder metal 16 into the weld pool formed during the welding process. The powder metal stream 16s may be formed more tightly with less divergence than from conventional powder nozzles for improving the welding process. The nozzle 14 may be configured for channeling the powder metal 16 with or without a conventional carrier gas, and in both situations improvement in the resulting powder metal stream 16s is obtainable. In an alternate embodiment, the powder metal 16 may be mixed with its carrier gas in a swirler or cyclone assembly before entering the nozzle 14, with a portion of the carrier gas being suitably removed therefrom and used in turn as the shaping gas 22 channeled into the manifold 40, which would eliminate the need for any additional gas supply if desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A nozzle for ejecting powder metal in a stream toward a workpiece comprising:

an inner tube having an inlet for receiving said powder metal, an outlet for discharging said powder metal, and a supply channel therebetween;

an outer tube disposed radially outwardly of said inner tube and coaxially therewith, and having a mounting end fixedly Joined to said inner tube adjacent to said powder inlet, a nozzle outlet at an opposite distal end thereof, an intermediate portion axially therebetween spaced radially outwardly from said inner tube to define an annular flow manifold radially therebetween, and an inlet disposed in said intermediate portion for channeling a shaping gas into said manifold;

said powder outlet being disposed coaxially with said nozzle outlet and spaced axially aft therein to define therebetween an annular gas outlet for said manifold for channeling said shaping gas around said powder metal discharged from said powder outlet prior to discharge from said nozzle outlet; and means disposed between said inner and outer tubes for confining said shaping as to confine said powder metal discharged from said powder outlet for reducing divergence of said discharged powder metal.

2. A nozzle according to claim 1 wherein said confining means comprise a plurality of circumferentially spaced apart shaping tubes disposed radially between said inner and outer tubes at a downstream end of said manifold between said gas inlet and said gas outlet, each shaping tube having an inlet disposed in flow communication with said manifold and an outlet disposed in flow communication with said gas outlet for collectively channeling said shaping gas thereto.

3. A nozzle according to claim 2 wherein said shaping tubes are cylindrical, circumferentially adjoin each other, and extend axially parallel to each other.

4. A nozzle according to claim 2 wherein said inner tube supply channel is cylindrical from said powder inlet to said powder outlet and has a constant flow area.

5. A nozzle according to claim 2 wherein:

said powder outlet has a frustoconical outer surface with said supply channel being disposed coaxially therewith; and said nozzle outlet has frustoconical outer and inner surfaces, with said inner surface being spaced from said outer surface of said powder outlet to define said gas outlet therebetween.

6. A nozzle according to claim 5 wherein said frustoconical outer surface of said powder outlet has a first cone angle $C_1$, and said frustoconical inner surface of said nozzle outlet has a second cone angle $C_2$ with said first cone angle $C_1$ being less than said second cone angle $C_2$.

7. A nozzle according to claim 2 wherein said outer tube mounting end is threadingly joined to said inner tube for allowing selective axial translation therebetween for adjusting size of said gas outlet defined between said powder outlet and said nozzle outlet therearound.

8. A nozzle according to claim 2 wherein:

said shaping tubes are cylindrical, circumferentially adjoin each other, and extend axially parallel to each other;

said inner tube supply channel is cylindrical from said powder inlet to said powder outlet and has a constant flow area;

said powder outlet has a frustoconical outer surface, with said supply channel being disposed coaxially therewith; and said nozzle outlet has frustoconical outer and inner surfaces, with said inner surface being spaced from said outer surface of said powder outlet to define said gas outlet therebetween.

9. A nozzle according to claim 8 in combination with:

means for supplying said powder metal to said powder inlet of said nozzle;

means for supplying said shaping gas to said gas inlet of said nozzle; and a welding laser effective for producing and directing a welding laser beam at said workpiece adjacent to said powder metal stream dischargeable from said nozzle outlet.

10. A combination according to claim 9 wherein said frustoconical outer surface of said powder outlet has a first cone angle, and said frustoconical inner surface of said nozzle outlet has a second cone angle with said first cone angle being less than said second cone angle.

\* \* \* \* \*